United States Patent
Lundberg et al.

(10) Patent No.: US 8,402,993 B2
(45) Date of Patent: Mar. 26, 2013

(54) HYDRAULIC FLUID COOLING SYSTEM FOR A DUAL CLUTCH AUTOMATIC TRANSMISSION

(75) Inventors: Philip C. Lundberg, Keego Harbor, MI (US); Bret M. Olson, Whitelake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 502 days.

(21) Appl. No.: 12/776,853

(22) Filed: May 10, 2010

(65) Prior Publication Data

US 2011/0272118 A1 Nov. 10, 2011

(51) Int. Cl.
*F16D 13/72* (2006.01)

(52) U.S. Cl. .......... 137/340; 137/599.14; 192/113.3

(58) Field of Classification Search ........... 192/85.61, 192/113.1, 113.3; 60/456; 137/340, 599.14
See application file for complete search history.

(56) References Cited

U.S. PATENT DOCUMENTS

| 6,361,287 | B1 | 3/2002 | Hopper | |
|---|---|---|---|---|
| 6,715,597 | B1 * | 4/2004 | Buchanan et al. | 192/70.12 |
| 7,311,187 | B2 | 12/2007 | Koenig et al. | |
| 7,395,908 | B2 * | 7/2008 | Hegerath et al. | 192/3.58 |
| 8,042,672 | B2 * | 10/2011 | Grethel et al. | 192/48.611 |

FOREIGN PATENT DOCUMENTS

| DE | 2141564 A1 | 2/1973 |
|---|---|---|
| DE | 4320353 A1 | 1/1994 |
| DE | 19813982 A1 | 10/1999 |
| DE | 19857222 A1 | 6/2000 |
| DE | 10147123 A1 | 4/2002 |
| DE | 10327406 A1 | 2/2005 |
| DE | 102004001753 A1 | 8/2005 |
| DE | 102005006431 A1 | 8/2006 |
| EP | 0157086 A1 | 10/1985 |
| EP | 0475488 A1 | 3/1992 |
| EP | 0933564 A2 | 8/1999 |
| EP | 1420185 A1 | 5/2004 |
| WO | WO9705410 A1 | 2/1997 |

* cited by examiner

*Primary Examiner* — Stephen M Hepperle
*Assistant Examiner* — Daniel Edelbrock

(57) ABSTRACT

A system for providing a constant flow of cooled hydraulic fluid to a dual clutch assembly of a transmission of a motor vehicle includes a hydraulic fluid cooler, a pressure control valve and a logic valve. The system is also capable of providing additional hydraulic fluid to the dual clutch assembly. The hydraulic fluid cooler provides hydraulic fluid to each clutch of a dual clutch assembly and to a logic valve. The logic valve is operable to divert additional fluid flow to either of the clutches of the dual clutch assembly.

13 Claims, 3 Drawing Sheets

HYDRAULIC FLUID COOLING SYSTEM FOR A DUAL CLUTCH AUTOMATIC TRANSMISSION

FIELD

The present disclosure relates to a hydraulic fluid cooling system for a transmission, and more specifically to a hydraulic fluid cooling system for a dual clutch transmission having a pressure source, a pressure control valve, a hydraulic fluid cooler and a logic valve.

BACKGROUND

The statements in this section merely provide background information related to the present disclosure and may or may not constitute prior art.

A typical dual clutch transmission configuration includes a pair of mutually exclusively operating input clutches which drive a pair of input shafts. The input shafts may be disposed on opposite sides of an output shaft or may be disposed concentrically between spaced-apart output shafts. One of each of a plurality of pairs of constantly meshing gears is freely rotatably disposed on one of the shafts and the other of each pair of gears is coupled to one of the other shafts. A plurality of synchronizer clutches selectively couple the freely rotatable gears to the associated shaft to achieve forward and reverse gear ratios. After the synchronizer clutch is engaged, the input clutch associated with the input shaft having the engaged synchronizer clutch is applied to transmit power through the transmission. Reverse gear is similarly achieved through an additional (idler) gear to provide torque reversal.

Dual clutch transmissions are known for their sporty, performance oriented operating characteristics which mimic those of a conventional mechanical (manual) transmission. They also typically exhibit good fuel economy due to their good gear mesh efficiency, ratio selection flexibility, reduced clutch losses and the lack of a torque converter.

There are several design considerations unique to dual clutch transmissions. For example, because of heat generated during clutch slip, the input clutches must be of relatively large size. Furthermore, such heat generation typically requires correspondingly larger and more complex cooling components capable of dissipating relatively large quantities of heat.

Cooling of the input clutches is typically achieved by a hydraulic control system having a cooling subsystem that delivers cooled hydraulic fluid to the input clutches. Such a system, itself under the control of an electronic transmission control module (TCM), includes hydraulic valves and actuators which engage the synchronizers and gear clutches.

Accordingly, there is room in the art for an apparatus and method for selectively providing cooled hydraulic fluid to the input clutches of a DCT to improve gear shift smoothness, timing, efficiency and durability while optimizing operating efficiency and thus fuel efficiency by designing such hydraulic control systems to more precisely deliver cooled hydraulic fluid to the input clutch generating the most heat.

SUMMARY

A hydraulic fluid cooling system for a transmission of a motor vehicle is provided having a hydraulic fluid pressure source, a hydraulic fluid cooler having an inlet port and an outlet port, a pressure control valve assembly, a first clutch cooling circuit, a second clutch cooling circuit and a logic valve. The pressure control valve assembly has an inlet port in communication with the hydraulic fluid pressure source and an outlet port in communication with the inlet port of the hydraulic fluid cooler. The first clutch cooling circuit has an inlet port in communication with the outlet port of the hydraulic fluid cooler through a first hydraulic fluid passage having a restrictive orifice. The second clutch cooling circuit has an inlet port in communication with the outlet port of the hydraulic fluid cooler through a second hydraulic fluid passage having a restrictive orifice. The logic valve has an inlet port in communication with the outlet port of the hydraulic fluid cooler, a first outlet port in communication with the inlet port of the first clutch cooling circuit and a second outlet port in communication with the inlet port of the second clutch cooling circuit. The logic valve further includes a valve movable between at least a first position and a second position. The inlet port of the logic valve is in communication with the first outlet port of the logic valve when the valve is in the first position. The inlet port of the logic valve is in communication with the second outlet port of the logic valve when the valve is in the second position.

It is thus an aspect of the present invention to provide a hydraulic fluid cooling system for a transmission having a spring biased blow-off safety valve having an inlet port in communication with the outlet port of the pressure control valve assembly and the inlet port of the hydraulic fluid cooler.

It is a further aspect of the present invention to provide a hydraulic fluid cooling system for a transmission with the pressure control valve assembly further including an actuation port.

It is a further aspect of the present invention to provide a hydraulic fluid cooling system for a transmission having a pressure control solenoid having an inlet port in communication with the hydraulic fluid pressure source and an outlet port in communication with the actuation port of the pressure control valve assembly.

It is a further aspect of the present invention to provide a hydraulic fluid cooling system for a transmission having the logic valve including a solenoid having an inlet port in communication with the hydraulic pressure fluid source and an outlet port in communication with an actuation port of the logic valve.

Further features, aspects and advantages of the present disclosure will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
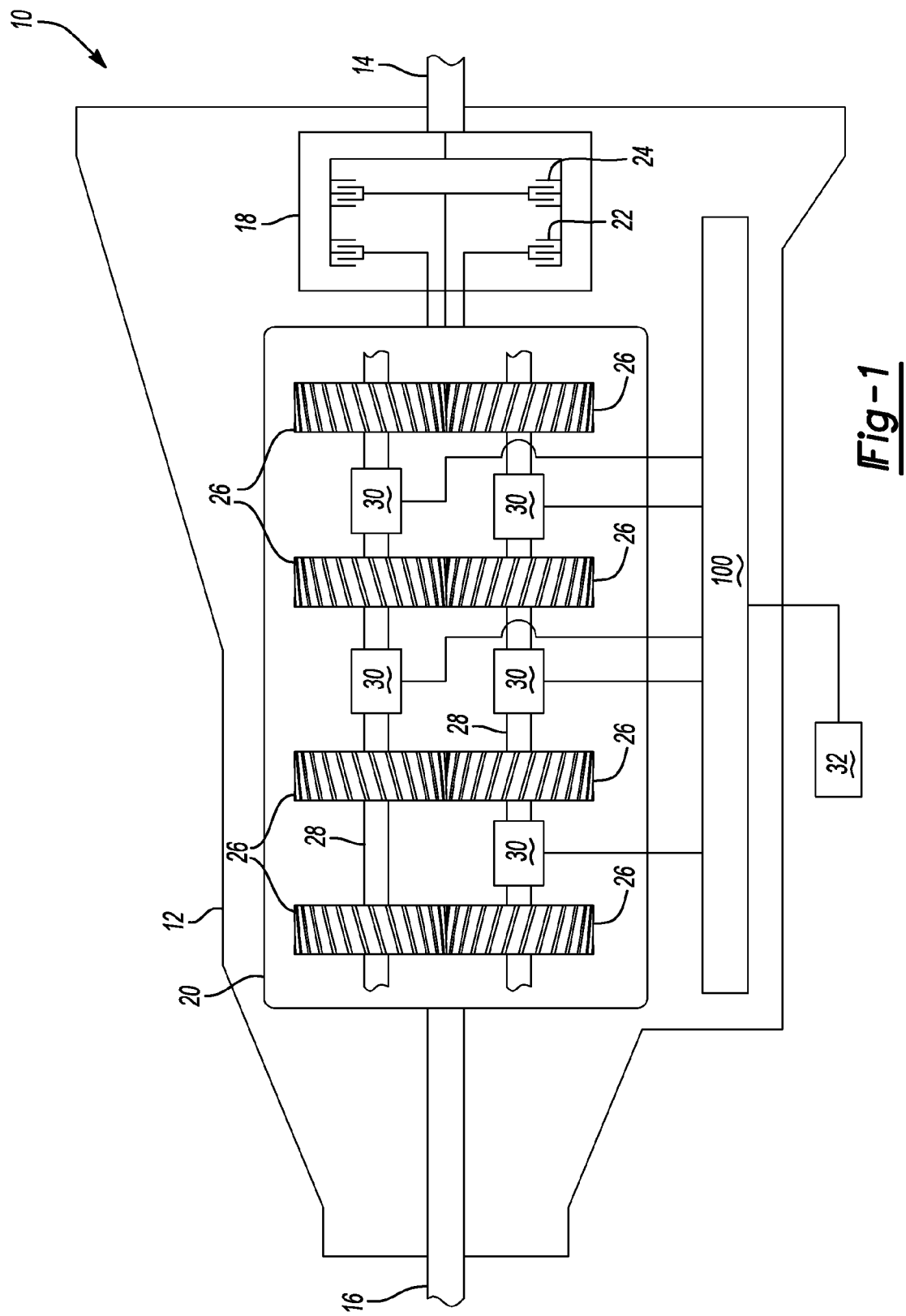
FIG. 1 is a schematic diagram of a powertrain having a hydraulic control system according to the principles of the present disclosure.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device or clutch 22 and a second torque transmitting device or clutch 24. The clutches 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention.

The gear arrangement 20 further includes a plurality of synchronizer assemblies 30 operable to selectively couple individual gears within the plurality of gear sets 26 to the plurality of shafts 28. Each synchronizer assembly 30 is disposed either adjacent certain single gears or between adjacent pairs of gears within adjacent gear sets 26. Each synchronizer assembly 30, when activated, synchronizes the speed of a gear to that of a shaft and a positive clutch, such as a dog or face clutch. The clutch positively connects or couples the gear to the shaft. The clutch is bi-directionally translated by a shift rail and fork assembly (not shown) within each synchronizer assembly 30.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30 through a hydraulic control system 100 according to the principles of the present invention.

Figure 2:
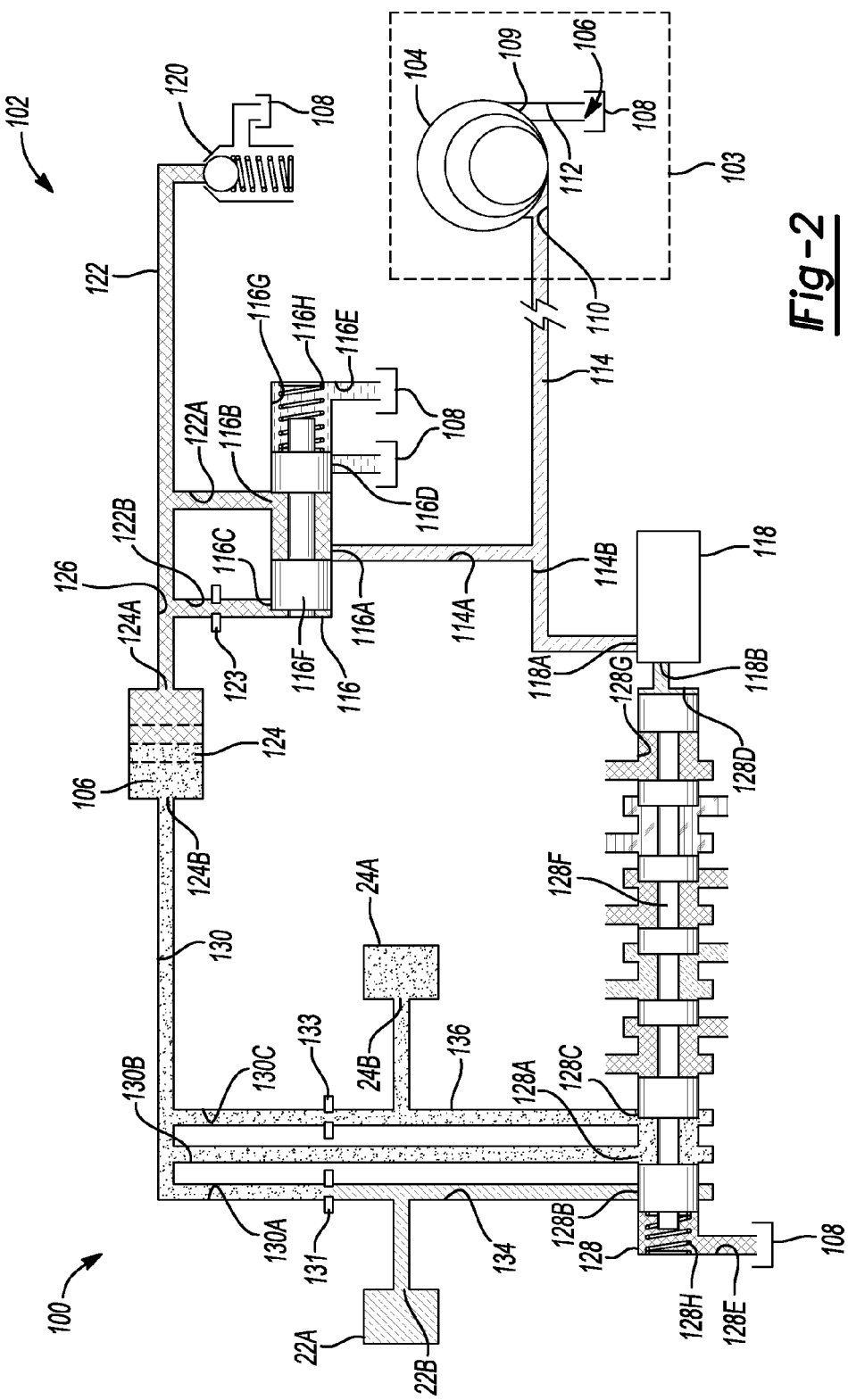
FIG. 2 is a diagram of an example of a cooling subsystem of a hydraulic control system according to the principles of the present invention.

Turning to FIG. 2, a portion of the hydraulic control system 100 including a cooling subsystem 102 is illustrated in more detail. It should be appreciated that the hydraulic control system 100 may include various other subsystems, such as actuator subsystems for actuating the torque transmitting devices of the DCT module 18, a lubrication subsystem, and an electronic range selection subsystem, etc., without departing from the scope of the present invention. The cooling subsystem 102 is connected to a line feed subsystem 103 that includes at least a pump 104 and further includes pressure regulator valves, solenoids, and other components (not shown) operable to control the pressure of the hydraulic fluid 106 from the pump 104. The cooling subsystem 102 is operable to selectively provide cooled hydraulic fluid 106 to the dual clutch assembly 18 and more specifically to a first and a second clutch circuit 22A, 24A and a first and a second clutch cooling circuit 22B, 24B of the first and second clutches 22, 24 of the dual clutch assembly 18.

A sump 108 is a tank or reservoir preferably disposed at the bottom of the transmission housing 12 to which the hydraulic fluid 106 returns and collects from various components and regions of the automatic transmission 10. The hydraulic fluid 106 is forced from the sump 108 and communicated throughout the hydraulic control system 100 through the line feed subsystem 103. The pump 104 of the line feed subsystem 103 is preferably driven by an engine (not shown) but could be driven by an electric motor and may be, for example, a gear pump, a vane pump, a gerotor pump, or any other positive displacement pump. The pump 104 includes an inlet port 109 and an outlet port 110. The inlet port 109 communicates with the sump 108 through a suction line 112. The outlet port 110 communicates pressurized hydraulic fluid 106 through the various pressure regulator valves, solenoids, and other components (not shown) to a supply line 114 of the cooling subsystem 102.

The supply line 114 communicates with a pressure control valve assembly 116 and a solenoid valve 118. The pressure control valve assembly 116 limits the maximum pressure of hydraulic fluid 106 in the cooler subsystem 102 of the hydraulic control system 100. The pressure control valve assembly 116 includes an inlet port 116A, an outlet port 116B, a feedback port 116C, a first exhaust port 116D and a second exhaust port 116E. The inlet port 116A communicates with a first branch 114A of the supply line 114. The outlet port 116B communicates with a first branch 122A of a fluid line 122. The feedback port 116C communicates with a second branch 122B of the fluid line 122. The branch 122B includes a restrictive orifice 123. The first and second exhaust ports 116D, 116E communicate with the sump 108.

The pressure control valve assembly 116 further includes a valve 116F slidably disposed within a bore 116G. The valve 116F automatically changes position to reduce flow from fluid line 114A (i.e. line pressure from the pump 104) to fluid line 122A. For example, the valve 116F is biased to a first position by a spring 116H. In the first position, at least a partial flow of fluid from line 114A communicates from the inlet port 116A through the pressure control valve assembly 116 to the outlet port 116B and then to branch 122A and fluid line 122. As the pressure within fluid line 122 increases, feedback pressure acting on the valve 116F via feedback port 116C moves the valve 116F against the spring 116H, thereby further reducing the pressure of the hydraulic fluid within fluid line 122, until a pressure balance is achieved on the valve 116F. By controlling the pressure to fluid line 122, the pressure control valve assembly 116 controls the maximum pressure feeding cooling subsystem 102 of the hydraulic control system 100.

The solenoid 118 is preferably an electrically controlled on/off solenoid. The solenoid 118 includes an inlet port 118A that communicates with an outlet port 118B when the solenoid 118 is activated or energized. The inlet port 118A is in communication with the supply line 114B. The outlet port 118B is in communication with an actuation port 128D of the logic valve assembly 128.

The fluid line 122 communicates with a spring biased blow-off safety valve 120 and a hydraulic fluid cooler 124.

The spring biased blow-off safety valve 120 communicates with the sump 108. The safety valve 120 is set at a relatively high predetermined pressure and if the pressure of the hydraulic fluid 106 in the fluid line 122 exceeds this pressure, the safety valve 120 opens momentarily to relieve and reduce the pressure of the hydraulic fluid 106.

The hydraulic fluid cooler 124 includes an inlet port 124A and an outlet port 124B. The inlet port 124A is in fluid communication with the fluid line 122. The outlet port 124B is in fluid communication with a fluid line 130. The hydraulic fluid cooler 124 is operable to dissipate heat in the hydraulic fluid 106 as the hydraulic fluid 106 flows through the hydraulic fluid cooler 124.

The fluid line 130 trifurcates into three parallel branches 130A, 130B, and 130C. Fluid branch 130A communicates with the first clutch circuit 22A and a logic valve assembly 128 through an orifice 131. Fluid branch 130B communicates directly with the logic valve assembly 128. Fluid branch 130C communicates with the second clutch circuit 24A and the logic valve assembly 128 through an orifice 133.

The logic valve assembly 128 is operable to direct cooled pressurized hydraulic fluid 106 from the hydraulic fluid cooler 124 to either of the first and second clutch circuits 22A, 24A as will be described in greater detail below. The logic valve assembly 128 includes an input port 128A, a first outlet port 128B, a second outlet port 128C, an actuation port 128D and an exhaust port 128E. The inlet port 128A communicates with the fluid branch 130B. The first outlet port 128B communicates with fluid branch 130A and the second outlet port 128C communicates with fluid branch 130C. The actuation port 128D communicates with an outlet port 118B of the solenoid 118. The logic valve assembly 128 may further include any number of additional inlet, outlet, and exhaust ports without departing from the scope of the present disclosure.

The logic valve assembly 128 further includes a valve 128F slidably disposed within a bore 128G. The valve 128F is actuated by the solenoid 118 that moves the valve 128F against a spring 128H. In a first position with the valve 128F not shifted against the spring 128H (i.e. a de-stroked position), hydraulic fluid 106 from fluid branch 130B is directed through the inlet port 128A to the second outlet port 128C. The valve 128F is shifted against the spring by activation of the solenoid 118. As pressure of the hydraulic fluid 106 acting on the valve 128F from the actuation port 128D via the solenoid 118 increases, a threshold is crossed where the valve 128F is shifted against the spring 128H. As the valve 128F shifts, hydraulic fluid from fluid branch 130B is directed through the inlet port 128A to the first outlet port 128B. For example, as the valve 128F shifts, port 128A communicates with port 128B, thereby bleeding off flow from fluid branch 130B to fluid branch 130A, and port 128C closes thereby further reducing the fluid flow to fluid branch 130C. As the valve 128F shifts completely against the spring 128H, the valve 128F diverts the cooled hydraulic fluid 106 from fluid branch 130B to port 128B such that the cooled hydraulic fluid 106 flows to the first clutch circuit 22A. Accordingly, the logic valve assembly 128 controls the flow rate of hydraulic fluid 106 between the first clutch circuit 22A and the second clutch circuit 24A.

The first clutch circuit 22A includes fluid passages that direct the cooled hydraulic fluid 106 throughout the first clutch 22. Similarly, the second clutch circuit 24A includes fluid passages that direct the cooled hydraulic fluid 106 throughout the second clutch 24. The hydraulic fluid 106 is then returned to the sump 108.

During operation, the line feed subsystem 103 provides a flow of hydraulic fluid 106 at a line pressure through supply line 114 to the solenoid 118 and to the pressure limit valve 116. The hydraulic fluid 106 flows from the inlet port 116A of the pressure control valve assembly 116 to the outlet port 116B and into the fluid line 122. From fluid line 122, the hydraulic fluid flows to the inlet 124A of the hydraulic fluid cooler 124. The cooled hydraulic fluid 106 then exits the hydraulic fluid cooler 124 though the outlet 124B and enters the fluid line 130. The cooled hydraulic fluid 106 enters the fluid branches 130A-C. The cooled hydraulic fluid 106 passes through the restrictive orifice 131 in the fluid branch 130A and enters the first clutch cooling circuit 22B at a reduced flow rate. Likewise, the cooled hydraulic fluid 106 passes through the restrictive orifice 133 in the fluid branch 130C and enters the second clutch cooling circuit 24B at a reduced flow rate. The clutch circuits 22A, 24A also receive additional cooled hydraulic fluid via the logic valve assembly 128 depending upon the cooling requirements of the clutches 22, 24. For example, when the valve 128F is in the first position fluid line 136 receives cooled hydraulic fluid 106 from branch 130B. Therefore, the second clutch circuit 24A receives the hydraulic fluid 106 from both the fluid branch 130C and fluid line 136 and the first clutch circuit 22A only receives hydraulic fluid 106 from fluid branch 130A. When the valve 128F is in the second position fluid line 134 receives cooled hydraulic fluid 106 from branch 130B. Therefore, the first clutch circuit 22A receives cooled hydraulic fluid 106 from both the fluid branch 130A and fluid line 134 and the second clutch circuit only receives hydraulic fluid 106 from the fluid branch 130C. Accordingly, the valve 128F is used to provide additional hydraulic fluid to whichever clutch 22, 24 requires additional cooling.

Figure 3:
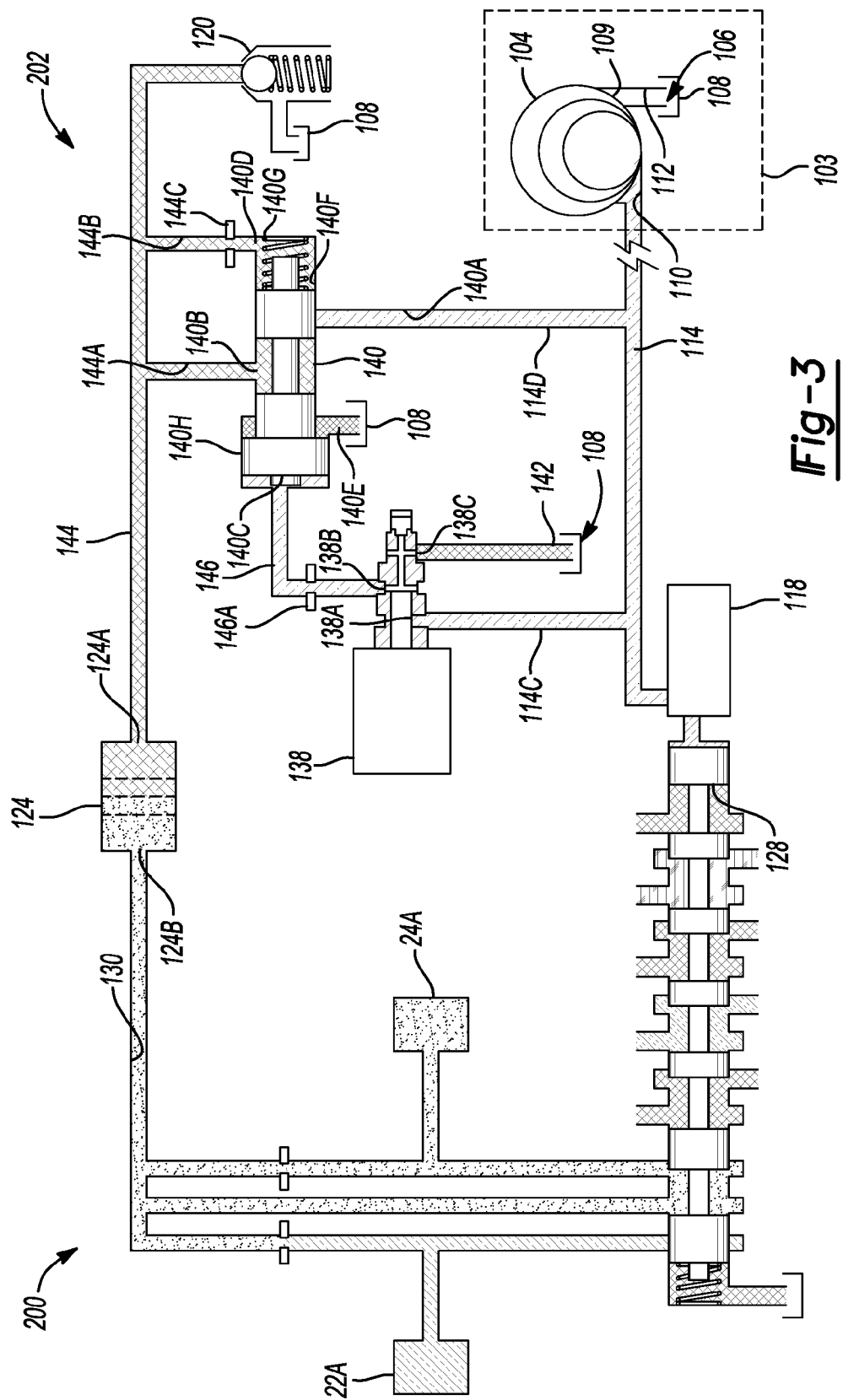
FIG. 3 is a diagram of another example of a cooling subsystem of a hydraulic control system according to the principles of the present invention.

Turning to FIG. 3, another example of a portion of the hydraulic control system 200 including a cooling subsystem 202 is illustrated. The invention of FIG. 3 is similar to that shown in FIG. 2 in that the cooling system includes a pump 104, a supply line 114, a solenoid 118, a safety valve 120, a pressure control valve assembly 140, a hydraulic fluid cooler 124, a logic valve assembly 128, and a first and a second clutch circuits 22A, 24A. The example of the invention of FIG. 3 is different from the example shown in FIG. 2 in that the cooling subsystem 202 alternatively includes a pressure control solenoid 138 and a control valve assembly 140.

The pressure control solenoid 138 is preferably an electrically controlled variable force solenoid. The pressure control solenoid 138 includes an inlet port 138A, an outlet port 138B and an exhaust port 138C. The inlet port 138A communicates with the outlet port 138B when the pressure control solenoid 138 is activated or energized. The exhaust port 138C communicates with the outlet port 138B when the pressure control solenoid 138 is inactive or de-energized. Variable activation of the pressure control solenoid 138 regulates or controls the pressure of the hydraulic fluid 106 as the hydraulic fluid 106 communicates from the inlet port 138A to the outlet port 138B. The inlet port 138A communicates with the supply line 114 through a first branch fluid line 114C. The outlet port 138B communicates with the control valve assembly 140. The exhaust port 138C communicates with an exhaust fluid line 142 that communicates with the sump 108.

The control valve assembly 140 includes an inlet port 140A, an outlet port 140B, an actuation port 140C, a feedback port 140D and an exhaust port 140E. The inlet port 140A communicates with a second branch fluid line 114D of the supply line 114. The outlet port 140B communicates with the feedback port 140D, the safety valve 120 and the hydraulic fluid cooler 124 through the fluid line 144 and a first branch fluid line 144A of fluid line 144. The actuation port 140C communicates with the outlet port 138B of the pressure control solenoid 138 through a fluid line 146. The fluid line 146 includes a restrictive orifice 146A. The feedback port 140D communicates with the fluid line 144 though a second branch fluid line 144B of the fluid line 144. The second branch fluid line 144B includes a restrictive orifice 144C.

The control valve assembly 140 further includes a valve 140H slidably disposed within a bore 140F. The valve 140H selectively changes position to reduce flow from fluid line 114D (i.e. line pressure from the pump 104) to fluid line 144A. For example, the valve 140F is biased to a first position by a spring 144G. In the first position, the valve 140F blocks hydraulic fluid 106 flow from the inlet port 140A to the outlet port 140B. In a second position, the pressure control solenoid 138 is activated to provide increased hydraulic fluid 106 pressure from the outlet port 138B of the pressure control solenoid 138. Since the outlet port 138B communicates with the actuation port 140C of the valve 140, the hydraulic fluid 106 pressure in the actuation port 140C increases and translates the valve 140H to the right, as illustrated in FIG. 3. The second position of the valve 140H allows the inlet port 140A to communicate with the outlet port 140B thus allowing hydraulic fluid 106 to flow through the control valve assembly 140 to fluid lines 144A and 144. As the pressure within fluid line 144 increases, feedback pressure acting on the valve 140H via port 140D moves the valve 140H against the hydraulic fluid 106 pressure in the actuator port 140C, thereby reducing the pressure of the hydraulic fluid 106 within fluid line 144, until a pressure balance is achieved on the valve 140H. By controlling the pressure to fluid line 144 which communicates through the hydraulic fluid cooler 124 to fluid line 130, the control valve assembly 140 controls the maximum pressure feeding the cooling subsystem 202 of the hydraulic control system 200.

During operation, the line feed subsystem 103 provides a flow of hydraulic fluid 106 at a line pressure through supply line 114 to the solenoid 118, to the pressure control solenoid 138 and to the control valve assembly 140. The hydraulic fluid 106 flows from the inlet port 138A of the pressure control solenoid 138 to the outlet port 138B and into the fluid line 146 through the restrictive orifice 146A and enters the actuation port 140C at a reduce flow rate. The pressurized hydraulic fluid 106 in the actuation port 140C translates the valve 140E to the right as shown in FIG. 3. This allows hydraulic fluid 106 to flow from the supply line 114 to the inlet port 140A of the control valve assembly 140 to the outlet port 140B and into the branch 144A of fluid line 144. From fluid line 144, the hydraulic fluid flows to the inlet 124A of the hydraulic fluid cooler 124. The remainder of the operation of the example shown in FIG. 3 is similar to that of the example shown in FIG. 2.

The description of the disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A hydraulic fluid cooling system for a transmission of a motor vehicle, the hydraulic fluid cooling system comprising:
   a hydraulic fluid pressure source;
   a hydraulic fluid cooler having an inlet port and an outlet port;
   a pressure control valve assembly having an inlet port in communication with the hydraulic fluid pressure source and an outlet port in communication with the inlet port of the hydraulic fluid cooler;
   a first clutch cooling circuit having an inlet port in communication with the outlet port of the hydraulic fluid cooler through a first hydraulic fluid passage having a restrictive orifice;
   a second clutch cooling circuit having an inlet port in communication with the outlet port of the hydraulic fluid cooler through a second hydraulic fluid passage having a restrictive orifice; and
   a logic valve having an inlet port in communication with the outlet port of the hydraulic fluid cooler, a first outlet port in communication with the inlet port of the first clutch cooling circuit and a second outlet port in communication with the inlet port of the second clutch cooling circuit, and wherein the logic valve further includes a valve movable between at least a first position and a second position, wherein the inlet port of the logic valve is in communication with the first outlet port of the logic valve when the valve is in the first position, and wherein the inlet port of the logic valve is in communication with the second outlet port of the logic valve when the valve is in the second position.

2. The hydraulic fluid cooling system of claim 1 further comprising a spring biased blow-off safety valve having an inlet port in communication with the outlet port of the pressure control valve assembly and the inlet port of the hydraulic fluid cooler.

3. The hydraulic fluid cooling system of claim 1 wherein the pressure control valve assembly further includes an actuation port.

4. The hydraulic fluid cooling system of claim 3 further comprising a pressure control solenoid having an inlet port in communication with the hydraulic fluid pressure source and an outlet port in communication with the actuation port of the pressure control valve assembly.

5. The hydraulic fluid cooling system of claim 1 wherein the logic valve includes a solenoid having an inlet port in communication with the hydraulic pressure fluid source and an outlet port in communication with an actuation port of the logic valve.

6. A hydraulic fluid cooling system for a transmission of a motor vehicle, the hydraulic fluid cooling system comprising:
   a hydraulic fluid pressure source;
   a hydraulic fluid cooler having an inlet port and an outlet port;
   a pressure control valve assembly having an inlet port in communication with the hydraulic fluid pressure source and an outlet port in communication with the inlet port of the hydraulic fluid cooler;
   a spring biased blow-off safety valve having an inlet port in communication with the outlet port of the pressure control valve assembly and the inlet port of the hydraulic fluid cooler;
   a first clutch cooling circuit having an inlet port in communication with the outlet port of the hydraulic fluid cooler through a first hydraulic fluid passage having a restrictive orifice;
   a second clutch cooling circuit having an inlet port in communication with the outlet port of the hydraulic fluid cooler through a second hydraulic fluid passage having a restrictive orifice; and
   a logic valve having an inlet port in communication with the outlet port of the hydraulic fluid cooler, a first outlet port in communication with the inlet port of the first clutch cooling circuit and a second outlet port in communication with the inlet port of the second clutch cooling circuit, and wherein the logic valve further includes a valve movable between at least a first position and a second position, wherein the inlet port of the logic valve is in communication with the first outlet port of the logic valve when the valve is in the first position, and wherein the inlet port of the logic valve is in communication with the second outlet port of the logic valve when the valve is in the second position.

7. The hydraulic fluid cooling system of claim 6 wherein the pressure control valve assembly further includes an actuation port.

8. The hydraulic fluid cooling system of claim 7 further comprising a pressure control solenoid having an inlet port in communication with the hydraulic fluid pressure source and an outlet port in communication with the actuation port of the pressure control valve assembly.

9. The hydraulic fluid cooling system of claim 6 wherein the logic valve includes a solenoid having an inlet port in communication with the hydraulic pressure fluid source and an outlet port in communication with an actuation port of the logic valve.

10. A hydraulic fluid cooling system for a transmission of a motor vehicle, the hydraulic fluid cooling system comprising:
- a hydraulic fluid pressure source;
- a hydraulic fluid cooler having an inlet port and an outlet port;
- a pressure control valve assembly having an inlet port in communication with the hydraulic fluid pressure source and an outlet port in communication with the inlet port of the hydraulic fluid cooler;
- a first clutch cooling circuit having an inlet port in communication with the outlet port of the hydraulic fluid cooler through a first hydraulic fluid passage having a restrictive orifice;
- a second clutch cooling circuit having an inlet port in communication with the outlet port of the hydraulic fluid cooler through a second hydraulic fluid passage having a restrictive orifice; and
- a logic valve having an inlet port in communication with the outlet port of the hydraulic fluid cooler, a first outlet port in communication with the inlet port of the first clutch cooling circuit and a second outlet port in communication with the inlet port of the second clutch cooling circuit, and wherein the logic valve further includes a valve movable between at least a first position and a second position, wherein the inlet port of the logic valve is in communication with the first outlet port of the logic valve when the valve is in the first position, and wherein the inlet port of the logic valve is in communication with the second outlet port of the logic valve when the valve is in the second position, and wherein the logic valve further includes a solenoid having an inlet port in communication with the hydraulic pressure fluid source and an outlet port in communication with an actuation port of the logic valve.

11. The hydraulic fluid cooling system of claim 10 further comprising a spring biased blow-off safety valve having an inlet port in communication with the outlet port of the pressure control valve assembly and the inlet port of the hydraulic fluid cooler.

12. The hydraulic fluid cooling system of claim 10 wherein the pressure control valve assembly further includes an actuation port.

13. The hydraulic fluid cooling system of claim 12 further comprising a pressure control solenoid having an inlet port in communication with the hydraulic fluid pressure source and an outlet port in communication with the actuation port of the pressure control valve assembly.

* * * * *